Figure 5:
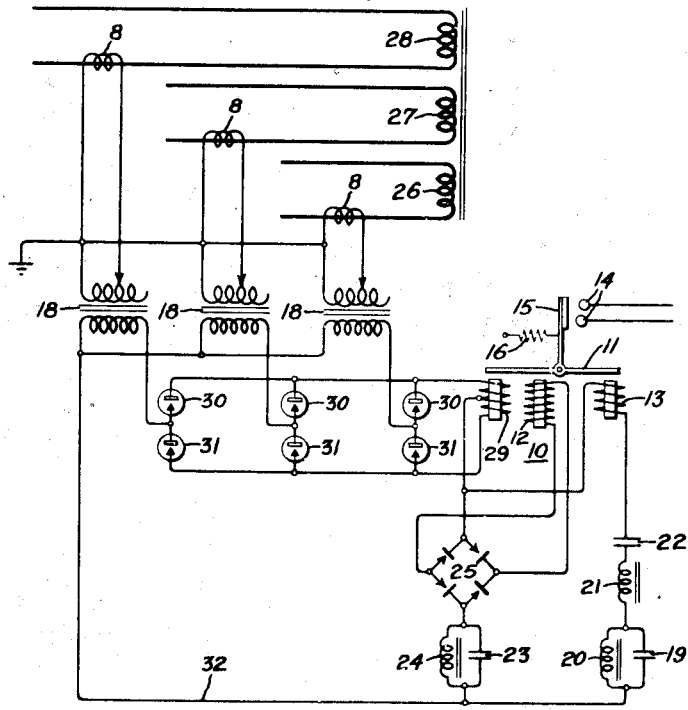

Sept. 4, 1945.  C. D. HAYWARD  2,384,375
PROTECTION OF ELECTRIC SYSTEMS
Filed June 6, 1940  6 Sheets-Sheet 1
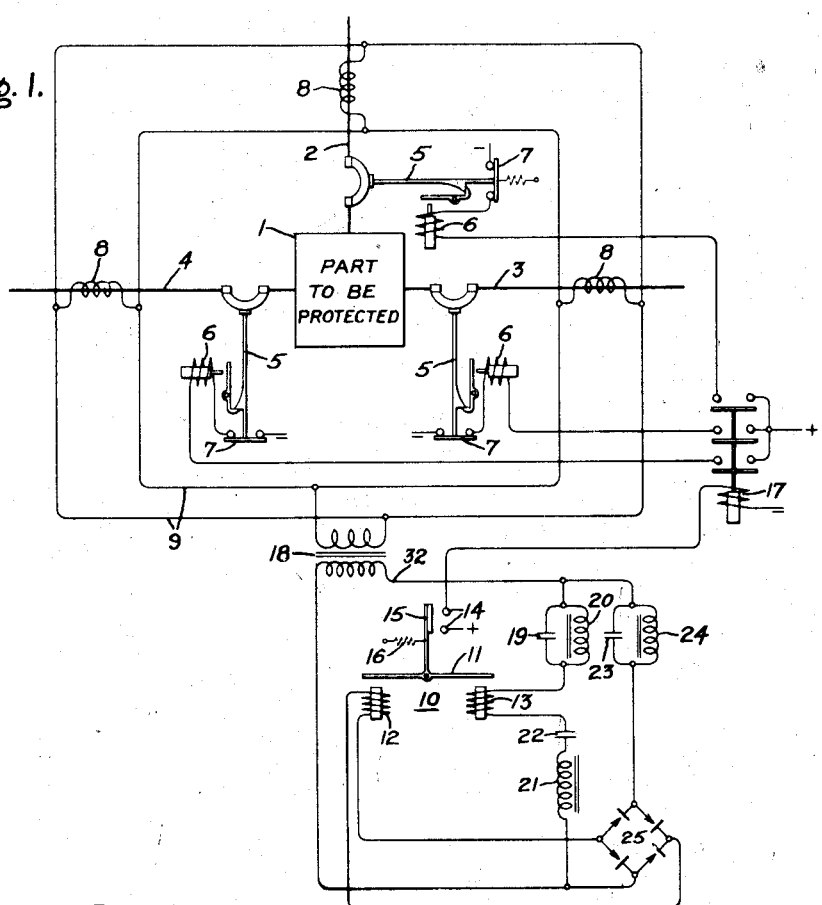
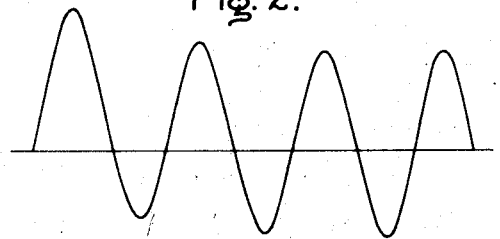
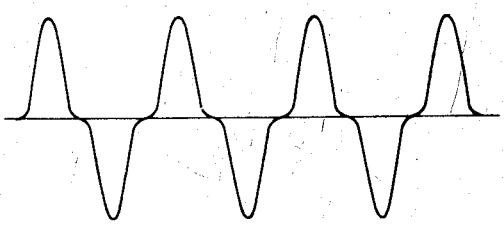
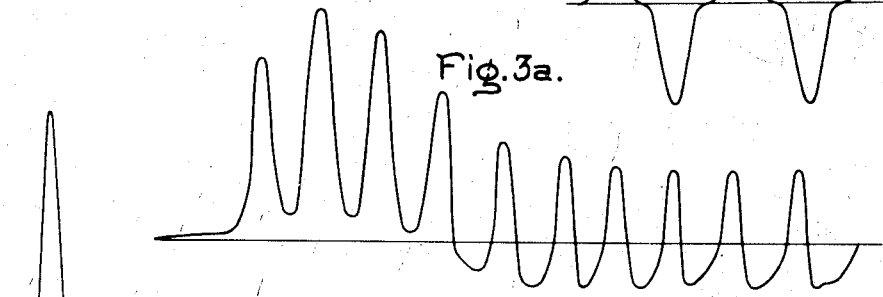
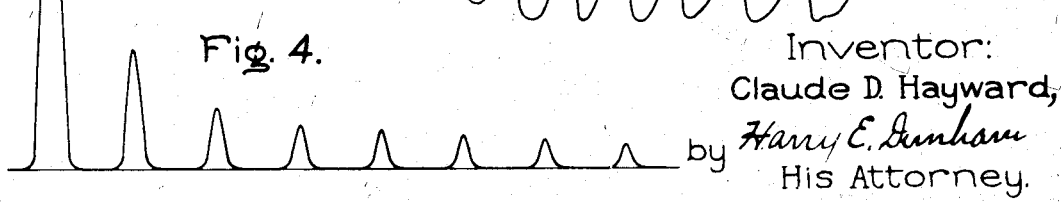
Inventor:
Claude D. Hayward,
by Harry E. Dunham
His Attorney.

Sept. 4, 1945.  C. D. HAYWARD  2,384,375
PROTECTION OF ELECTRIC SYSTEMS
Filed June 6, 1940  6 Sheets-Sheet 3
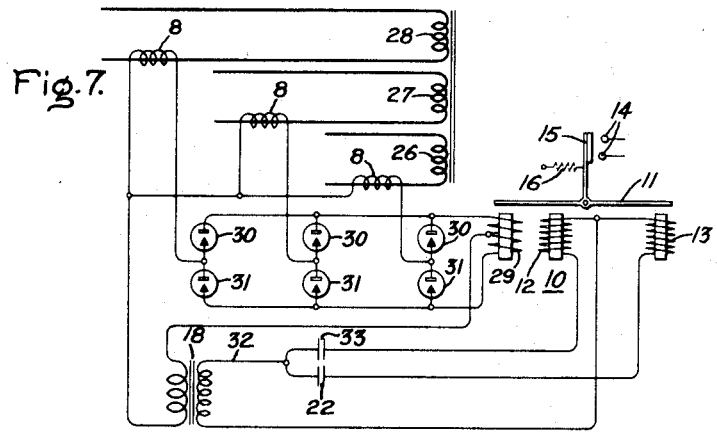
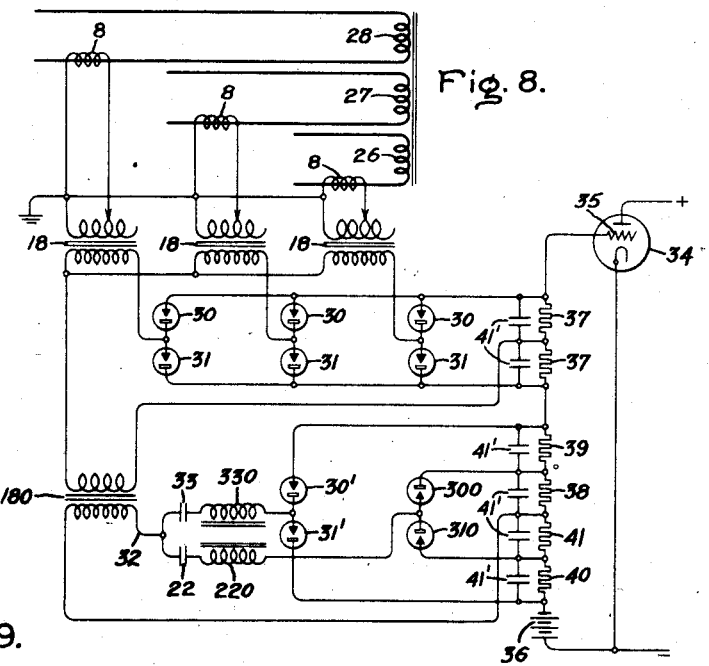
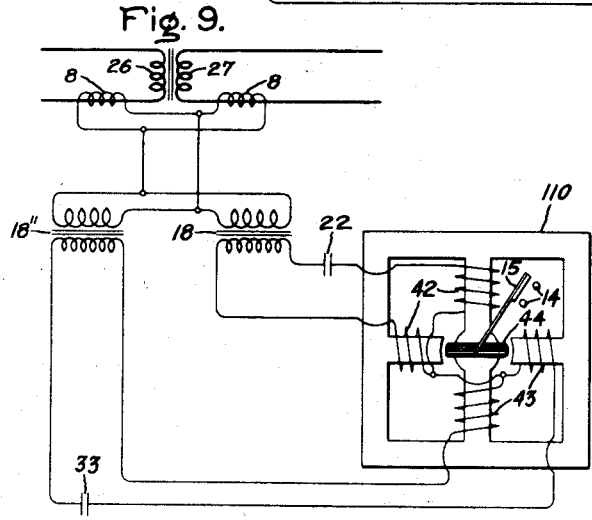
Inventor:
Claude D. Hayward,
by Harry E. Dunham
His Attorney.

Sept. 4, 1945.  C. D. HAYWARD  2,384,375
PROTECTION OF ELECTRIC SYSTEMS
Filed June 6, 1940   6 Sheets-Sheet 4

Inventor:
Claude D. Hayward,
by Harry E. Dunham
His Attorney.

Sept. 4, 1945.  C. D. HAYWARD  2,384,375
PROTECTION OF ELECTRIC SYSTEMS
Filed June 6, 1940  6 Sheets-Sheet 5

Inventor:
Claude D. Hayward,
by Harry E. Dunham
His Attorney.

Sept. 4, 1945.     C. D. HAYWARD     2,384,375
PROTECTION OF ELECTRIC SYSTEMS
Filed June 6, 1940     6 Sheets—Sheet 6

Inventor:
Claude D. Hayward,
by Harry E. Dunham
His Attorney.

Patented Sept. 4, 1945

2,384,375

UNITED STATES PATENT OFFICE 2,384,375

PROTECTION OF ELECTRIC SYSTEMS

Claude D. Hayward, Lansdowne, Pa., assignor to General Electric Company, a corporation of New York Application June 6, 1940, Serial No. 339,096

44 Claims. (Cl. 175—294)

My invention relates to improvements in the protection of electric systems and more particularly the differential protection of alternating current electric systems and parts thereof. One object of my invention is to provide an improved differential protective arrangement which will not function erroneously when faults occur outside of the differentially protected zone. Another object of my invention is to provide an improved differential protective arrangement which will not function erroneously because of magnetizing currents appearing in the zone of protection. A further object of my invention is to provide an improved differential protective arrangement which is universally applicable to protect parts of systems regardless of the number of current paths into and out of a part or the relative directions of the currents in such paths. These and other objects of my invention will appear in more detail hereinafter.

Differential relaying is a commonly accepted way of protecting power lines, power transformers, alternating current generators and station bus systems against internal faults. The methods and circuits employed, although differing in detail, are fundamentally alike in principle. This common principle consists in continuously comparing in each phase the current entering the protected equipment with that leaving. The comparison is made by means of current transformers of suitable ratios placed in all of the power circuits connecting with the protected equipment. If current transformation takes place within the equipment, as in the case of power transformers, the ratios of the current transformers in the various circuits are chosen to have relative values corresponding to the transformation ratios so that the current transformer secondary windings may be compared on an equal basis. The secondary windings of all of the current transformers in each phase are connected in parallel to a special current relay, usually called a differential relay. The current transformers are all connected in the same polarity in respect to the direction of the protected zone so that currents entering and leaving the protected zone at any instant will be represented in the secondary circuits by currents of opposite direction. Normally, with sound equipment, these incoming and outgoing currents will be equal, except for negligible exciting currents, and their instantaneous sum which, by the connection, is applied to the relay coil will be essentially zero. When a fault occurs within the protected zone, the balance is upset and a difference current proportional to the fault current energizes the relay causing it to operate and trip circuit breakers in the connecting circuits whereby to remove the faulted equipment from service.

It is important that the faulted equipment be isolated as quickly as possible not only to limit damage to the equipment but also to minimize the length of time that the voltage is lowered. A prolonged period of low voltage is likely to result in loss of synchronism in rotating machines normally electrically connected to each other and to the faulted equipment. When this occurs, the excessive current drawn by the machines out-of-step often causes other protective relays to operate, thereby tripping circuit breakers until the power system is unnecessarily divided. This is apt to cause a major interruption of service. A prolonged period of low voltage also results in loss of load due to the operation of undervoltage devices. For similar reasons, it is important that loaded equipment should not be needlessly put out of service due to false operation of relays when no internal fault is present. Unbalanced currents may sometimes flow in differential relay circuits when no internal fault is present. Such unbalanced currents may cause false operation of differential relays unless means are provided to prevent such false operation.

When a heavy current, due, for example, to an external fault, is drawn through the equipment protected by differential relaying, the current transformers may become saturated and their ratios depart from their normal values by an amount dependent on their designs, the amounts and power factors of their secondary burdens, and the magnitude and asymmetry of the fault current. With full rated burden connected to a current transformer secondary and with a current of fault value passing through the primary, the ratio may so depart from the normal value that only a fraction of the current calculated from the normal ratio flows in the secondary.

Saturation may be due to the magnitude of the symmetrical alternating current component, or it may arise in consequence of the direct current transient component of an offset wave. The effect of the latter may be more pronounced because the rate of decay of the direct current transient is relatively slow particularly when the fault occurs near a high capacity generating station where the fault current may have a transient direct current component which decays quite slowly. This direct current component causes a higher degree and different type of saturation in the current transformers than would be the case if they were located electrically a considerable distance from the source where the direct current component in the fault current has a much faster rate of decay.

If, in a differential relay connection involving only two current transformers each subjected to the same primary current, the ratio departures of the current transformers were the same, the sum of the secondary currents would still be zero and no difference current would flow in the relay. However, where more than two current transformers are involved and the primary currents in the several current transformers are not equal, then there is now no known way by which the differential current in the case of a through fault can be made zero except by design of current transformers which have no ratio departure under any condition. This is practically prohibitive.

The usual method of preventing false relay operation on differential currents due to current transformer saturation has been to use what is termed a percentage differential relay. This type of relay compares the differential current with the through current and requires that the differential current exceed a certain percentage of the through current before the relay operates. This is accomplished by connecting a restraining coil of the relay in series with each of the current transformer secondaries. This type of relay has been widely and successfully used on alternating current generators and on two and three winding transformers. Where only two circuits are involved, as in the case of the generator and the two winding transformer, the relative directions of the currents in the two current transformer secondaries is always the same when the equipment is sound. Consequently, both restraining coils may be placed on a single restraint magnet acting on the relay armature. In the general three winding transformer, where the relative directions of current flow in the three windings may be different under different conditions, it is necessary that the three restraint coils be placed on separate magnets acting individually on the armature. Where more than three windings are involved, or similarly, in the case of bus systems, where there are many circuits, the use of this type of relay involves certain complications.

When a switch is closed, suddenly applying potential to a winding of a previously deenergized transformer, the transient magnetizing current which flows may for a time reach very high values depending upon the amount of residual magnetism left in the transformer core from previous operation and upon the point of the voltage wave at which the switch is closed. Compared with normal steady state magnetizing current which, for large power transformers, is about 5% of full load current, the transient magnetizing inrush current may reach values many times full load current. Since this magnetizing current flows in only one of the power transformer windings, it causes a corresponding difference current to flow in the differential relay and thus causes false operation of the relay.

This tendency of differential relays to operate on magnetizing inrush currents has been offset in the past either by using a slow acting relay, by desensitizing the relay, or by rendering it ineffective for a definite time after the application of the potential thus enabling the relay to carry over the magnetizing inrush period. The latter two ways have been effected by the use of a time delay voltage operated auxiliary relay energized from a potential transformer connected across a winding of the power transformer and having contacts effective a predetermined time after the application of potential to the power transformer to remove a shunt around the operating coil or to close a trip circuit contact in series with the differential relay contacts. Judged by the standards of modern protective relay practice, none of these methods is satisfactory since the first is slow on internal faults and the second involves a time interval of reduced protection, and the third a time interval of no protection at all. Cases may be encountered, particularly in large twenty-five cycle transformer installations, where the inrush transient period may last for several seconds. Considerable damage may be done to the transformer and the system stability may be seriously disturbed if a fault existing in the transformer when potential was applied, is allowed to remain for such a length of time.

In accordance with my invention, I prevent the false operation of differential protective arrangements on unbalanced currents due to the reasons described by restraining effects dependent upon certain characteristics such as the harmonic and the direct current components of the current transformer secondary currents derived from the equipment to be protected. In other words, in accordance with my invention, I make use of the differences in wave form between the differential current caused by an internal fault and that resulting from current transformer saturation and magnetizing inrush currents to prevent false operation of the relay, that is, to insure that the relay operates only when a fault exists within the protected zone. Further, in accordance with my invention, to obtain the utmost in protection, I may limit the operating effect of the relay to practically the fundamental wave of the current transformer secondary current derived from the part of the system to be protected.

This application is a continuation-in-part of my copending application, Serial No. 179,016, filed December 9, 1937, for Protection of electric systems, the subject matter of said prior application being incorporated in this application together with additional subject matter.

My invention will be better understood from the following description when considered in connection with the accompanying six sheets of drawings, and its scope will be pointed out in the appended claims.

Figure 6:
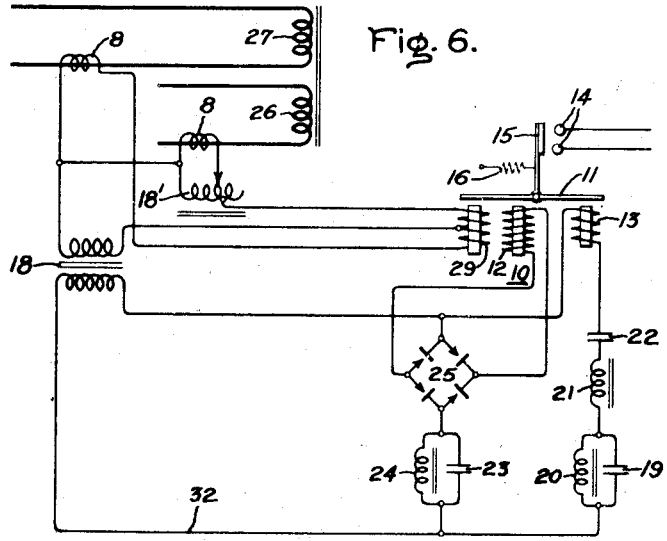
Figure 10:
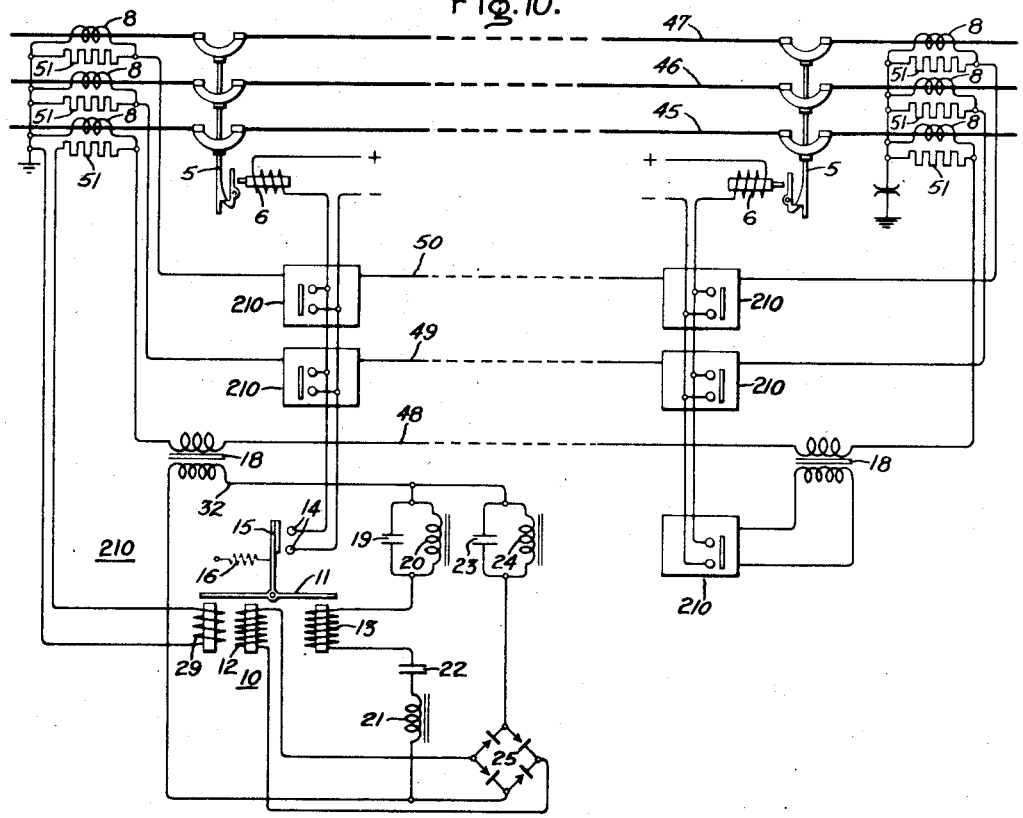
Figure 11:
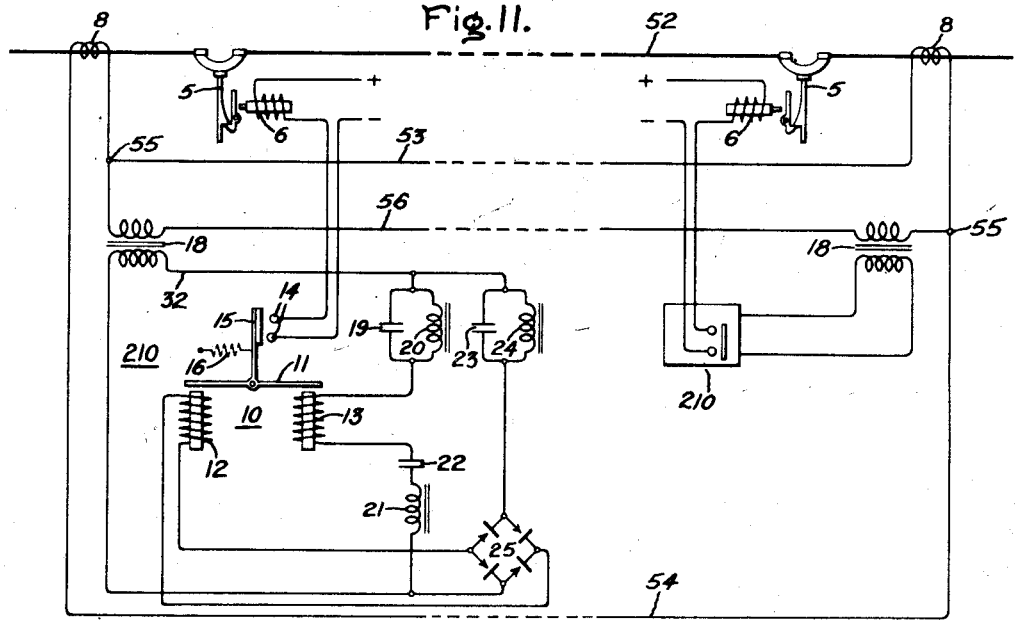
Figure 12:
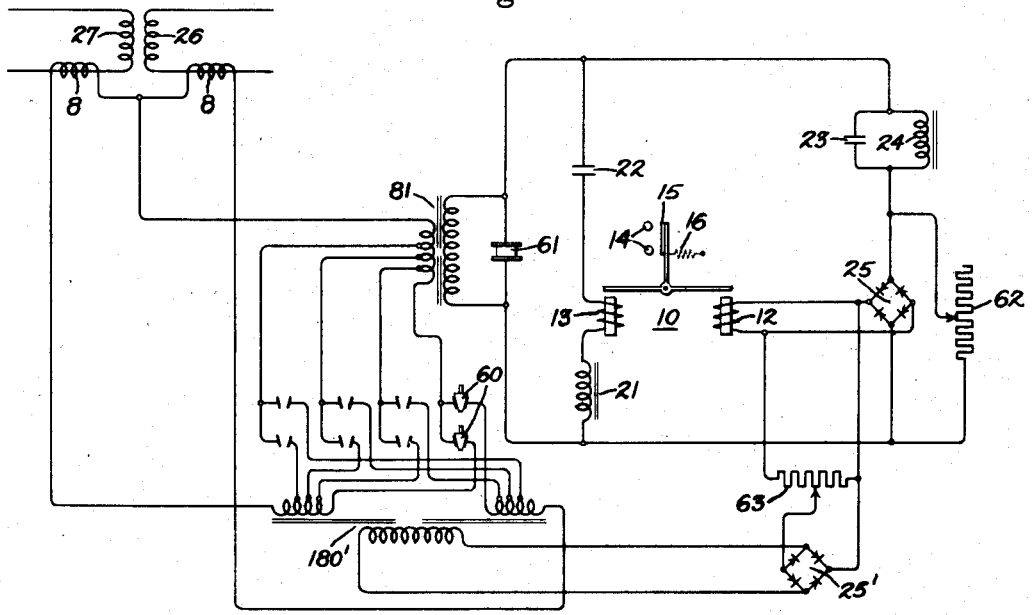
Figure 13:
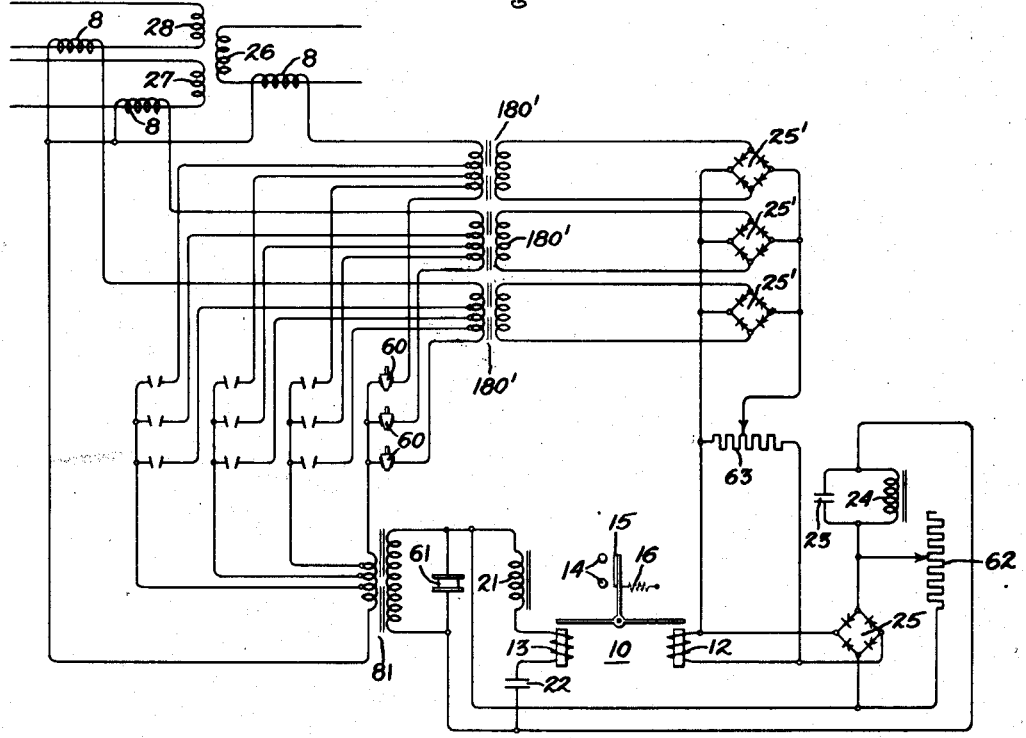
Figure 14:
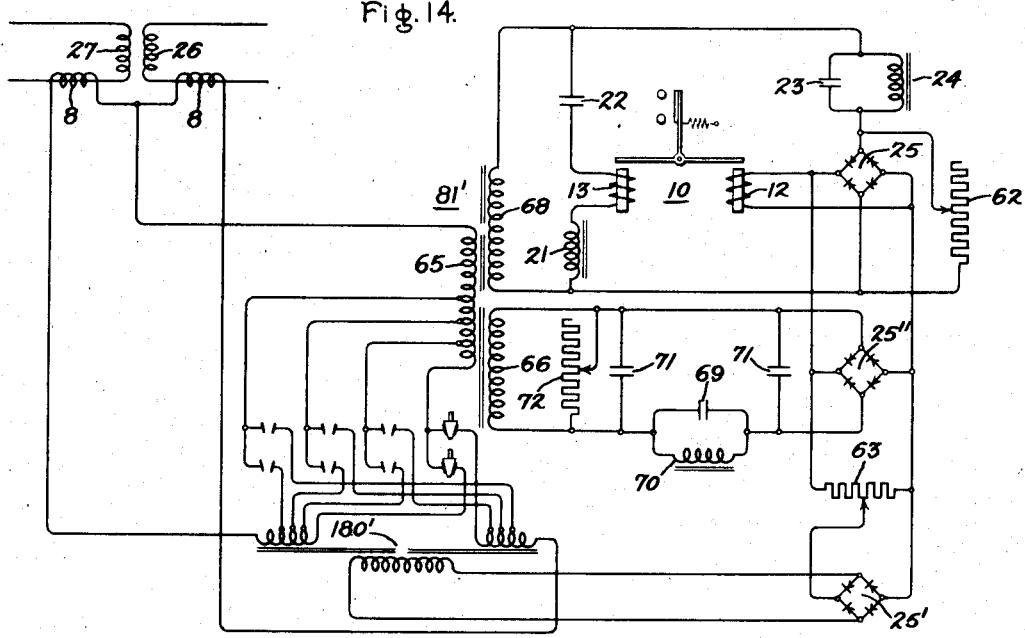
Figure 15:
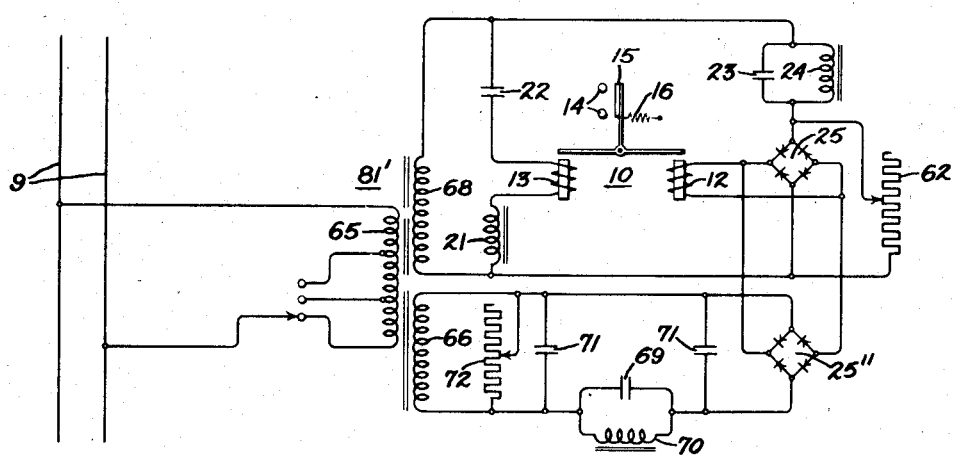
Figure 16:
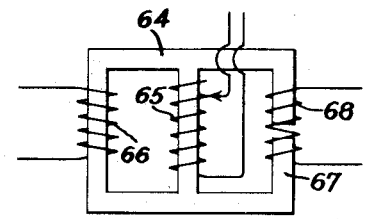

In the accompanying six sheets of drawings, Fig. 1 illustrates diagrammatically an embodiment of my invention as applied to the differential protection of a part of an electric system to which a plurality of circuits are connected; Fig. 2 is a typical wave form of a current transformer derived differential current associated with an internal fault; Fig. 3 is a typical wave form of a current transformer derived differential current associated with steady state saturation of the current transformers; Fig. 3a is a typical wave form of a current transformer derived differential current associated with transient saturation of the current transformers on current waves having a long time constant direct current component; Fig. 4 is a typical wave form of a current transformer derived differential current associated with magnetizing inrush currents; Figs. 5, 6 and 7 illustrate diagrammatically modifications of my invention as applied to the differential protection of power transformers and using electromechanical differential relays; Fig. 8 illustrates diagrammatically an embodiment of my invention as applied to the protection of a power transformer and using an electric discharge valve type of differential relay. Fig. 9 illustrates diagrammatically another embodiment of my invention as applied to the protection of a power transformer and using a dynamometer type of relay; Fig. 10 illustrates diagrammatically an embodiment of my invention as applied to a pilot wire opposed voltage type of differential protection for a section of an electric power line; Fig. 11 illustrates diagrammatically an embodiment of my invention as applied to a pilot wire circulating current type of differential protection for a section of an electric power line, shown in single line diagram for simplicity; Figs. 12 and 13 illustrate diagrammatically another modification of my invention as applied to the differential protection of power transformers without direct current component restraint; Fig. 14 illustrates diagrammatically a further modification of my invention as applied to the differential protection of a power transformer with both harmonic and direct current component restraints; Fig. 15 illustrates diagrammatically a modification of my invention as applied to the differential protection of a bus or generator with both harmonic and direct current component restraints; and Fig. 16 illustrates one type of auxiliary transformer suitable for use in the embodiments of my invention shown in Figs. 14 and 15.

In the embodiment of my invention, shown in Fig. 1, a part I of an alternating current system to be protected differentially is shown as having a plurality of circuits 2, 3 and 4 arranged to be connected to the part I through suitable circuit interrupting means such as latch-closed circuit breakers 5. As shown, each of these is provided with a trip coil 6 and an auxiliary switch 7 which is closed when the circuit breaker is closed and opens to break the circuit of the trip coil when the circuit breaker opens. The part I is indicated schematically by a square since it may be most any part of an electric system, such as, a power transformer, a dynamo-electric machine, a station bus, a section of an electric power line, any combination of two or more of these, or, in general, any electrical equipment to which differential protection is applicable. Also, everything is shown on a single phase basis since the application to the other phases will be, in general, a mere duplication of the arrangement illustrated. In order to derive the desired differential current, that is, a current which is dependent on the vector difference between the currents flowing into and out of the part I over the circuits 2, 3 and 4 connected thereto, there is connected in each of these circuits a current transformer 8. These may be connected, as shown, on the far side of the circuit breakers relatively to the part to be protected in order to include the circuit breakers in the protected zone. The secondaries of these transformers are connected in parallel in an auxiliary or protective relay energizing circuit 9, such that a device connected across this circuit will be energized at all instants in accordance with the sum of the currents flowing through the secondaries of the current transformers, which is dependent on the difference between the currents flowing into and out of the protected zone.

Inasmuch as the characteristics of this differential current, whose value should normally be substantially zero, constitute, in accordance with my invention, the criteria for distinguishing between internal faults for which isolation of the protected part from the rest of the system should be effected and other conditions which resemble such faults, but are not, and for which isolation should not be effected, it is important to consider the character of the differential current under the different conditions. Thus, referring to Fig. 2, which represents the wave form of a typical current transformer derived differential current under internal fault conditions of the part to be protected, it is found, upon analysis, that the differential current consists principally of the fundamental, a variable percentage direct current component and small percentages of harmonics. On the other hand, referring to Fig. 3, which represents the wave form of a typical current transformer derived differential current under large sustained primary currents such as occur with external faults and produce saturation of the current transformers, it is found, upon analysis, that after the inrush of magnetizing current the differential current consists principally of the fundamental and a high percentage of third harmonic. From Fig. 3a, which represents the wave form of a typical current transformer derived current on large external fault primary currents containing a transient direct current component of long time constant, it is obvious, upon analysis, that during the first few cycles the differential current consists principally of the fundamental and a high percentage of direct current with very little harmonic current. Later the direct current component disappears and an increasing percentage of second and third harmonic currents appears. Eventually, if the fault continued for a long time, the wave form would assume the shape shown in Fig. 3. Referring to Fig. 4, which represents the wave form of a typical current transformer derived differential current under transient magnetizing inrush conditions arising in the apparatus to be protected, it is found, upon analysis, that the differential current consists principally of the fundamental, a high percentage direct current component, a high percentage of second harmonic and smaller percentages of higher harmonics.

In accordance with my invention, I use these different characteristics for obtaining the desired restraining and operating effects to insure correct functioning of the differential protection under all conditions. In the case of the restraining effect, it is preferable to use all of the harmonics and the direct current component instead of any one alone. For example, in the different types of waves, shown in Figs. 3, 3a and 4, for which restraint is desired, different harmonics and the direct current component predominate. Consequently, a relay designed to restrain on the second harmonic component only, for example, while suitable for magnetizing inrush currents, would not be properly restrained on currents obtained from current transformers which have become saturated. On the other hand, if the restraining effect were made dependent on the third harmonic only, proper restraint would be obtained on saturated current transformer currents but not on magnetizing inrush currents. The use of the direct current component alone would not be satisfactory because this component is absent in the steady state saturated current transformer current.

The use of a certain amount of direct current component restraint is necessary to prevent operation during the first few cycles of the differential current wave due to transient saturation of the current transformers on external faults as shown in Fig. 3a. However, such direct current component restraint must not be excessive since in the case of an internal asymmetrical fault current, the relay fault current would be unnecessarily delayed due to the slow decay of the direct current transient. An amount of direct current restraint sufficient to prevent operation on currents having a direct current component equal to or greater than the corresponding value of the fundamental frequency alternating current component has been found to be satisfactory. Differential current waves of the type shown in Fig. 3a, in which the harmonic currents disappear for a few cycles due to extreme direct current saturation, occur only when the direct current component in the primary fault current has a slow rate of decay as is frequently the case when the fault is near high capacity generating equipment. When the differential protection is applied to equipment located electrically at a considerable distance from generating sources, the direct current component of the fault current has a much faster rate of decay. In this case the type of differential current wave shown in Fig. 3a does not occur and a high percentage of harmonics is always present in the differential current due to external faults. Hence, in relays used for applications of this type, the direct current restraint feature may be omitted.

Referring again to Fig. 1, I provide a differential relay 10 which may be of the electro-mechanical type schematically shown. As illustrated, this relay comprises a movable member such as a pivoted armature 11 on opposite sides of which act a restraining winding 12 and an operating winding 13. The operating winding 13 tends to effect the closing of the relay contacts 14 through a circuit controlling member 15, which is biased to the open position by suitable means such as a light spring 16. The contacts 14 may be directly in the trip coil circuit, but where several circuit breakers have to be tripped simultaneously, it may be preferable to have the contacts 14 control the circuit of a multi-contact auxiliary relay 17 which, in turn, controls the energization of the trip coil circuits.

In accordance with my invention, I energize the restraining coil 12 by at least one, the predominant one of the harmonics of the current transformer derived differential current and preferably all of them and the direct current component, if any, but not by the fundamental. Also, for refinement in operation, I may energize the operating coil 13 practically by the fundamental of the current transformer derived differential current. Inasmuch as these arrangements require tuned circuits involving the use of condensers and since I may also apply rectifiers, as will subsequently appear, I connect across the differential circuit 9 a step-down transformer 18 to reduce the differential current to values readily accommodated by standard ratings of the condensers and rectifiers used in the relay. Across the secondary of this transformer, I connect through a conductor 32 two parallel circuits, one of which includes the operating coil 13 of the relay and the other of which includes the restraining coil 12 of the relay. The operating coil circuit includes a wave trap such as a condenser 19 and an inductance 20 in parallel. This parallel resonant circuit or wave trap is tuned to block the predominant harmonic. The overall circuit of the operating coil 13, however, including this trap, the operating coil 13 and an inductance 21, is tuned for series resonance by a condenser 22 to have low impedance to the fundamental frequency. The restraining coil circuit branch includes a parallel resonant circuit or wave trap consisting of a condenser 23 and an inductance 24. This wave trap is tuned to block the fundamental frequency. The overall circuit may be untuned.

With this arrangement, it will be obvious that the operating coil circuit branch readily passes current of the fundamental frequency but blocks the predominant harmonic and, to a large extent, currents of all harmonic frequencies, since the operating circuit, including a trap for either the second or third harmonic is in effect also a high impedance path for both second and third as well as higher harmonics. Inasmuch as currents of both forms shown in Figs. 3 and 4 are likely to occur on through faults, the difference current due to current transformer magnetizing inrush and subsequent sustained saturation, involves first the predominant second harmonic and then the predominant third harmonic associated with these magnetic phenomena, it is in general desirable to eliminate the operating effects of both of these harmonics. While this may be done as shown in Fig. 1, it will be apparent from what has heretofore been described that the operating coil circuit may include two separate traps in series, one tuned to the second harmonic and the other to the third harmonic or a single trap tuned to some frequency intermediate that of the second and third harmonics and such as to render the operating effect of both of these harmonics a minimum. The restraining coil circuit branch allows the harmonic frequencies to pass with moderate impedance but blocks the fundamental. Steady direct current is prevented from flowing in the relay coil circuits by the relay current transformer 18. Transient current surges may flow in the secondary circuits, however, due to the sudden application of the direct current component when the differential current starts. These current surges have comparatively steep wave fronts, and hence pass through condensers with little impedance. The surges divide between the operating and restraining coil circuit branches essentially in inverse proportion to the relative inductances of the two branches with all condensers considered as being short circuited. The addition of the inductance 21 in the operating coil circuit momentarily prevents the operation of the relay 10 due to these current surges on magnetizing inrush currents by diverting most of this surge through the restraining circuit.

Since the restraint current has a frequency differing from that of the operating current, it would, if used directly, pass through zero at different times than the operating current. At these times, the restraining pull would be released, and the relay armature 11 would tend to move by momentary flicks in the operating direction. These flicks might frequently be of sufficient magnitude to cause contact operation. In order to avoid this possibility of erroneous operation, I provide in the circuit of the restraining winding suitable rectifying means such as a full wave rectifier 25 which, together with the inductance of the restraining coil 12, is sufficiently effective in smoothing the restraint current and hence, the restraint pull, to prevent any harmful chattering movement of the armature.

With the foregoing arrangement, it will be obvious that a differential current, such as shown in Fig. 2, due to an internal fault, flows principally in the operating winding 13 and hence causes high speed operation of the relay 10. On the other hand, a differential current, like that shown in Fig. 4, produced by magnetizing inrush and a differential current, like that shown in Figs. 3 and 3a produced by current transformer saturation will flow partly in the operating coil 13 and partly in the restraining coil 12. The restraining effect of the harmonics can be made greater than the operating effect of the fundamental, for example, by having the air gap of the restraining magnet shorter than that of the operating magnet or by more turns on the restraining magnet so that the restraint pull predominates and the relay does not operate.

In the embodiment of my invention shown in Fig. 5 as applied to protect the windings 26, 27 and 28 of one phase of a three winding power transformer, the restraining effect of the differential relay 10 consists, in addition to the harmonic restraint previously described, of a percentage through current restraint which may be provided by a coil 29. With this arrangement the percentage through current restraint can be reduced without allowing false operation due to current transformer ratio departures, thus providing more sensitive protection without the probability of false operation due to the magnetizing inrush current. The relay coils 12 and 29 are shown on separate magnetic cores for simplicity, but any construction such, for example, as a single magnet which will provide an additive effect of the two restraints is satisfactory. In order to obtain secondary currents from the current transformers 8 best suited to the standard ratings of equipment units readily available, the current reducing transformers 18 may be provided, and these may have adjustable primaries to provide refinements in balancing turn ratios. Further, in order to obtain the desired through current restraint, I provide in circuit with the secondaries of the current transformers 18 rectifiers 30 and 31 so as to avoid the necessity for multiple restraining magnets and other relay structural complications.

With this arrangement, it will be obvious that as long as the sum of the currents into and out of the three windings of the power transformer is zero, no currents except those due to transient magnetizing and saturation effects will appear in the operating and restraining coils 13 and 12 respectively, but the through current will flow in the coil 29 whose turns may be proportioned relatively to the coils 12 and 13 to provide the desired percentage restraint. On the occurrence of an internal fault in the power transformer, however, the difference or fault current will be reflected proportionately in the circuit comprising the conductor 32 whence its components will be divided according to the relative impedances of the circuits of the operating and restraining coils 13 and 12 to such components and then returned through one-half of the restraining winding 29 and by way of the rectifier 30 or 31 to the respective intermediate current transformers 18. Under these conditions, the operating winding 13 will predominate to effect a circuit closing operation of the relay 10. In case of external faults or conditions involving magnetizing inrush currents, whereby an unbalance is produced giving the appearance of an internal fault, the restraining effect of the windings 12 and 29 will predominate over the operating winding 13. The operating effect is, of course, dependent on the fundamental of the difference current. The restraining effect of the coil 12 is independent of the fundamental frequency and dependent only on the harmonics and the direct current component. Inasmuch as all the difference current flows in half of the restraining winding 29, the restraining effect of this winding will also be dependent on all the components of this difference current.

The embodiment of my invention shown in Fig. 6 is essentially the same as that shown in Fig. 5 except that it is applied to a power transformer having only two windings 26 and 27. Consequently, the rectifiers 30 and 31 may be omitted and only one intermediate current reducing transformer needs to be capable of adjustment for ratio matching purposes. For this purpose, one of the intermediate current reducing transformers, such as 18', may be an adjustable autocurrent transformer. With these differences in mind, the operation of this embodiment of my invention will be obvious from the description given in connection with Fig. 5.

The embodiment of my invention shown in Fig. 7 is similar to the arrangement shown in Fig. 5 except that it is assumed that the current ratios of the current transformers 8 are proportioned to match the turn ratios of the power transformer windings 26, 27 and 28, and none of this matching is done in the intermediate current reducing transformers 18, as in Fig. 5. It is, therefore, possible to use but one current reducing transformer 18 whose primary is connected between the common point of the current transformers 8 and the midpoint of the through current restraint coil 29. Since the power transformer has more than two windings, the rectifiers 30 and 31 may again be employed to simplify the relay structure, as previously pointed out. With this arrangement, the difference current is branched from the conductor 32 to the operating and restraining coils 13 and 12 respectively through condensers 22 and 33 so proportioned that the operating coil circuit is tuned to the fundamental frequency of the difference current and the circuit of the restraining coil 12 is tuned to the frequency of the predominant harmonic for which restraint is most desired. With the foregoing differences in mind, the operation of this embodiment of my invention will also be obvious from the description given in connection with Fig. 5.

The embodiment of my invention shown in Fig. 8 differs fundamentally from the arrangements shown in Figs. 5 and 7 in the substitution of an electric discharge valve type of relay for the electro-mechanical relay 10. The electric discharge valve 34, illustrated, is of the three electrode type, and its anode circuit constitutes the working or relay controlling circuit which may include the circuit breaker trip coil or coils, not shown. The grid 35 of this valve may have an initial bias just below the operating point of the valve from a suitable source, such as a battery 36 to render the valve nonconducting. The grid further receives a through current restraining control voltage from the resistances 37. The circuit 32 from the current reducing and insulating transformer 180 divides into two series resonant circuits one of which comprises the condenser 22 and an inductance 220 and the other of which comprises the condenser 33 and an inductance 330. The condenser 33 and its associated inductance 330 may be tuned to the difference current harmonic which provides the best all around restraint. Dependent upon the direction of the half wave of current in this tuned circuit, current flows through the resistances 38 and 39 and the rectifier 30' or through the rectifier 31' and the resistances 40 and 41 to provide a restraining control voltage on the grid 35 of the valve 34. Similarly, depending upon the direction of the half wave of current in the tuned circuit comprising the condenser 22 and the inductance 220, current flows through the rectifier 300 and the resistance 38 or the resistance 41 and the rectifier 310 to provide an operating control voltage on the grid of the valve 34. Also a further difference current restraining control voltage appears in one or the other of the resistances 37 depending on the direction of the half wave of current. Smoothing condensers 41' connected across the respective resistances 37—41 may be provided.

Obviously, the valve 34 will be rendered conductive or nonconductive depending on the sum and polarities of the voltage drops in the resistances 37—41, inclusive, and the biasing battery 36. Thus, when the operating voltage drops across the resistances 38 and 41, due to the current in the tuned circuit comprising the condenser 22 and the inductance 220, exceeds the restraining voltage drops across the resistances 38, 39, 40, and 41 and the resistances 37, as will occur in the case of an internal fault on the power transformer, the valve 34 will be rendered conductive. Under other conditions, as in the case of external faults and transient magnetizing currents, the total restraining control voltages on the valve 34 will exceed the operating control voltages whereby to maintain the valve nonconducting. From the foregoing, it will be observed that the resistances 38 and 41 constitute, in effect, the operating elements and the resistances 37—41, inclusive, the restraining elements of the electric discharge valve relay.

The embodiment of my invention, shown in Fig. 9, is analogous to the arrangement shown in Fig. 7 except that the application of the differential protection is to a power transformer having only two windings 26 and 27, and a dynamometer type of relay 110 is employed for a differential relay. The particular dynamometer type of relay which I have chosen to illustrate is disclosed in United States Letters Patent 2,000,803, issued May 7, 1935, to the assignee of this invention. This relay has two fundamental electric circuits, one of which comprises the operating windings 42 and a condenser 22 so proportioned as to provide with its associated current transformer 18 a series resonant circuit tuned to the fundamental of the difference current. The other circuit includes the restraining coils 43 and the condenser 33 which form together with its associated current transformer 18" a series resonant circuit tuned to the predominant harmonic which provides the most effective restraint for the purpose at hand. Depending upon the relative magnitudes of the currents in the two tuned circuits, the movable member or short-circuited winding 44 of the relay 110 will be actuated either to move its circuit controlling member 15 to close the contacts 14 or to maintain it in the open circuit position. On faults within the power transformer, the operating effect of the tuned resonant circuit, comprising the condenser 22 and the coils 42, will predominate over the restraining effect of the tuned resonant circuit, comprising the condenser 33 and the coils 43, to effect the circuit closing action of the relay 110. If the latter tuned resonant circuit is tuned to the second harmonic, for example, the transient magnetizing currents, arising either in the power transformer or the current transformers 8, will not cause an erroneous operation of the relay. Obviously the differential relay restraining and operating circuits shown in Fig. 1 may be substituted for the restraining and operating circuits shown in Figs. 7, 8 and 9.

In Fig. 10, I have illustrated an embodiment of my invention as applied to the opposed voltage pilot wire differential protection of a section of a three-phase power line comprising phase conductors 45, 46 and 47 extending, for example, between two station buses, not shown, but connected thereto through circuit breakers 5 having trip coils 6. Associated with each conductor at each end of the section are current transformers 8, connected through pilot conductors 48, 49 and 50, for opposed voltages on currents through the section. Associated with the respective pilot conductors at each station is a differential relaying means 210 embodying my invention. For simplicity, only one of these relaying means is shown in its complete features at one end of the section since the others are mere duplicates. For through current restraint, each current transformer 8 is provided with a loading resistance 51 through which the through current restraining winding 29 is connected in series. As with the arrangement shown in Fig. 1, the circuit of the operating coil 13 is tuned to the fundamental of the difference current, which appears in the associated current reducing current transformer 18, and is trapped by the parallel resonant circuit, comprising the condenser 19 and the inductance 20, for the harmonics of the difference current most likely to cause erroneous operation, in general, the second and third harmonics. Also the circuit of the restraining coil 12 is trapped for the fundamental of the difference current by the parallel resonant circuit, comprising the condenser 23 and the inductance 24.

In this arrangement, it will be obvious that on through currents in the section, the restraints of the coils 29 and 12 will predominate even though the heavy through currents cause current transformer saturation and difference current involving a high percentage of third harmonic. In the case of a fault in the section, the operating effect of the coil 13 predominates over the restraining effects of the coils 12 and 29 whereby to effect the completion of the circuit of the circuit breaker trip coil 6 at the station and thus cause, in conjunction with similar action at the other station, the isolation of the faulty section.

In Fig. 11 I have illustrated an embodiment of my invention as applied to the circulating current pilot wire differential protection of a section of a three phase power line. For simplicity, only one phase conductor 52 is illustrated as extending between two station buses, not shown, but connected thereto through circuit breakers 5 having trip coils 6. Associated with the phase conductor 52 at each end of the section are current transformers 8, connected through pilot conductors 53 and 54, for circulating current on currents through the section. Connected across normally equal potential points 55 of this circulating current pilot circuit by a pilot conductor 56 which includes the primaries of the current reducing current transformers 18, are differential relaying means 210 embodying my invention. For simplicity, only one of these relaying means is shown in its complete features at one end of the section since the other is a mere duplication. As with the arrangement shown in Fig. 1, the circuit of the operating coil 13 is tuned to the fundamental of the difference current, which appears in the current reducing current transformers 18 and is trapped by the parallel resonant circuit comprising the condenser 19 and the inductance 20 for the harmonic of the difference current most likely to cause erroneous operation, in general, the third harmonic for line protection. Also the circuit of the restraining coil 12 is trapped for the fundamental of the difference current by the parallel resonant circuit comprising the condenser 23 and the inductance 24. To avoid the flicking effects heretofore mentioned, the rectifier 25 and the inductance 21 may be provided.

With this arrangement, it will be obvious that on through currents in the section giving rise to a difference current, the restraint of the coil 12 will predominate because the difference current involved will contain a high percentage of third harmonic and possible other harmonics. The predominant third harmonic and also any direct current component will, however, be unable to pass through the operating coil 13. In case of a fault in the section, there will be a large difference current, principally of fundamental frequency, and the operating effect of the coil 13 will predominate over the restraining effect of the coil 12 to effect the tripping of the circuit breaker 6 and thereby the isolation of the faulty section.

In the embodiment of my invention shown in Fig. 12 as applied to protect one phase of a power transformer comprising the windings 26 and 27, I connect in the differential current circuit of the system current transformers 8 a differential current transformer 81 and in the through current circuit a through current transformer 180'. In order to eliminate the effect of the direct current component saturation in case of an asymmetric fault current, each of these auxiliary current transformers 81 and 180', in accordance with my invention, comprises a magnetic core having an air gap such that saturation of the transformer does not occur. Inasmuch as any direct current component, such as that of an offset or asymmetric fault current, applied to the primary winding is practically consumed as magnetizing current, there is no appreciable corresponding secondary current. In other words, the air gap cores in these transformers 81 and 180' effectively block the direct current components of the differential and through currents applied to their primary windings so that substantially no direct current component is present in the transformer secondary currents. For line current transformer ratio matching, the auxiliary through current transformer 180' may be provided with suitable adjusting means such as tap blocks comprising plugs 60. In order to prevent excessive voltages across the secondary winding of the differential current transformer 81, suitable voltage breakdown means, such as an impedance device 61, which decreases in impedance as the voltage applied across it increases may be used. Such a device is disclosed, for example, in United States Letters Patent 1,822,742.

The circuit of the operating winding 13 is made resonant to the fundamental of the differential current by suitable tuning of the circuit with the condenser 22, the inductance 21 and the inductance of the winding 13. The differential restraining circuit includes the rectifier 25 and the fundamental frequency trap comprising the condenser 23 and the inductance 24. For adjustment of the amount of harmonic restraint, suitable means, such as the variable resistance 62, may be connected across the input side of the restraining circuit. Also, in accordance with my invention, the restraining effect may include, besides the harmonics of the differential current, all of the components of the through current except the direct current component which is substantially eliminated by virtue of the air gap core transformer 180'. For this purpose the rectifier 25' may be connected across the secondary winding of the through current transformer 180'. For adjustment of this restraint suitable means, such as the variable resistor 63, may be connected across the output side of the rectifier 25', as shown.

The embodiment of my invention shown in Fig. 13 is similar to the arrangement shown in Fig. 12 except that it is applied to a power transformer comprising three windings 26, 27, 28. As with the arrangement shown in Fig. 12, the operating effect is dependent upon substantially only the fundamental of the differential current while the restraining effect is dependent upon substantially only the harmonics of the differential and the through currents since the direct current components of these currents are substantially eliminated by virtue of the air gap core of the auxiliary differential and through current transformers as in Fig. 12.

As pointed out in connection with Fig. 1, the tendency of the relay 10 to operate on the direct current component is greatly reduced by virtue of the fact that such component divides between the operating and restraining coil circuit branches in inverse proportion to the relative inductances of these two branches. With the arrangement shown in Figs. 14 and 15, this tendency is positively eliminated. However, as herein pointed out, cases may arise where restraint, dependent upon the direct current component of the differential current as well as the harmonics, is desired. Thus, when the relay is located at points where asymmetric faults may occur without harmonics appearing in the differential circuit, direct current component restraint is desirable to take care of this condition, but such restraint must not be excessive since it could result in an unnecessarily long time delay in case of an internal asymmetric fault.

In order to have both harmonic and direct current differential restraints, I may, in accordance with my invention, use an arrangement, such as shown in Fig. 14, wherein the differential current transformer 81' is so constructed as to provide in its secondary winding 68 a differential current which has substantially no direct current component and in its other secondary winding 66 a differential current which may have a direct current component. The current transformer 81' may be in two parts, one without an air gap core and one with an air gap core, the two parts, in the arrangement shown in Fig. 14, having a common primary winding 65. Alternatively the current transformer 81' may comprise, as shown in Fig. 16, a single three-legged core 64 having a center leg carrying a primary winding 65, an outside leg without an air gap carrying a secondary winding 66 and another outside leg 67 provided with an air gap and carrying a secondary winding 68. In series with the secondary winding 66, as shown in Fig. 14, I provide a fundamental frequency block comprising a condenser 69 and an inductance 70. For by-passing harmonics, I provide suitable means, such as condensers 71. As shown, the output of the secondary winding 66 is supplied to the restraining circuit of the winding 12 through suitable means, such as the rectifier 25''. In order to vary the amount of the direct current component restraint, suitable means, such as a variable resistance 72, may be connected across the transformer winding 66. Thus with the arrangement shown in Fig. 14 it will be apparent that the operating effect of the winding 13 is dependent upon substantially only the fundamental of the differential current whereas the restraining effect is dependent upon all the components of the differential current and all of the components of the through current except the direct current component thereof.

The embodiment of my invention shown in Fig. 15 is particularly applicable for the protection of buses or generators and provides both harmonic and direct current component differential restraints. The summation current transformer circuit of the part to be protected is indicated by the conductors 9 after the manner shown in Fig. 1. Connected across this circuit is the primary winding 65 of the auxiliary differential current transformer 81' with the secondary windings 66 and 68 connected after the manner shown in Fig. 14 so as to energize the auxiliary winding 13, in accordance with substantially only the fundamental of the differential current, and the restraining winding 12, in accordance with all the harmonics of the differential current and the direct current component of the differential current. Also, as in the embodiment of my invention shown in Fig. 14, the harmonic and direct current component restraints of the differential current are independently adjustable at the resistances 62 and 72 respectively.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States is:

1. In a protective arrangement for an electric system having a part into and out of which alternating currents flow, current transforming means for deriving an alternating current dependent on the currents flowing into and out of said part, a device to be operated, and means for controlling said device in accordance with a comparison of only two effects one dependent on the fundamental of said derived current and the other dependent on at least one of the harmonics of said derived current and substantially independent of the fundamental thereof.

2. In a protective arrangement for an electric system having a part into and out of which alternating currents flow, current transforming means for deriving an alternating current dependent on the currents flowing into and out of said part, a device to be operated, and means for exerting on said device an operating effect dependent on the fundamental of said derived current and a single restraining effect dependent on at least one of the harmonics of said derived current and substantially independent of the fundamental thereof.

3. In a protective arrangement for an electric system having a part into and out of which alternating currents flow, current transforming means for deriving an alternating current dependent on the currents flowing into and out of said part, a device to be operated, and means for controlling said device in accordance with the comparison of only two effects one dependent on the fundamental of said derived current and the other dependent on the harmonics of said derived current and substantially independent of the fundamental thereof.

4. In a protective arrangement for an electric system having a part into and out of which alternating currents flow, current transforming means for deriving an alternating current dependent on the currents flowing into and out of said part, a device to be operated, and means for controlling said device in accordance with a comparison of two effects one of said effects being dependent on the fundamental of said derived current and the other of said effects being dependent on the sum of two separate effects one of which is dependent on the fundamental and all of the harmonics of said derived current and the other of which is dependent on a plurality of the harmonics of said derived current.

5. In a protective arrangement for an electric system comprising apparatus subject to transient magnetizing currents and into and out of which alternating currents flow, current transforming means for deriving a current dependent on said inflowing and outflowing currents, means energized by said derived current for effecting the interruption of the circuit of said apparatus on the occurrence of a fault in the apparatus, and means selectively responsive to predetermined harmonics of said derived current for preventing erroneous operation of said controlling means on the occurrence of a fault on the system external to said apparatus and also on transient magnetizing currents of the apparatus and of said current transforming means.

6. In a protective arrangement for an electric system having a part into and out of which alternating currents flow, current transforming means for deriving an alternating current dependent on the currents flowing into and out of said part and means energized by said derived current for effecting the isolation of said part from the rest of the system on the occurrence of a fault in the part including a relay device having an operating element and a restraining element, means for energizing said operating element in accordance with the fundamental of said derived current, and means for energizing said restraining element substantially only in accordance with the harmonics of said derived current.

7. In a protective arrangement for an electric system having a part into and out of which a plurality of alternating currents flow, differential means for effecting the isolation of said part from the rest of the system on the occurrence of a fault in said part including current transformers respectively connected to be energized by said alternating currents, relay means having a winding element and means for energizing said element from said current transformers in accordance with the magnitude of the through current of said system part including rectifier means respectively connected to be energized in accordance with said alternating currents.

8. In a protective arrangement for an electric system having a part into and out of which at least three alternating currents flow, differential relay means for effecting the isolation of said part from the rest of the system on the occurrence of a fault in the part including current transformers respectively connected to be energized by said alternating currents, a single winding restraining element, and means for energizing said element from said current transformers in accordance with the magnitude of the through current of said system part including rectifier means respectively connected to be energized in accordance with said alternating currents.

9. In a protective arrangement for an electric system having a part into and out of which alternating currents flow, current transforming means for deriving an alternating current dependent on the currents flowing into and out of said part and means energized by said derived current for effecting the isolation of said part from the rest of the system on the occurrence of a fault in the part including a relay device having operating and restraining elements, means for energizing said operating element in accordance with the fundamental of said derived current, and means for energizing said restraining element substantially in accordance with at least the second and third harmonics of said derived current and independently of the fundamental thereof.

10. In a protective arrangement for an electric system having a part into and out of which alternating currents flow, current transforming means for deriving an alternating current dependent on the currents flowing into and out of said part and means energized by said derived current for effecting the isolation of said part on the occurrence of a fault in the part including a relay device having an operating element and two restraining elements, means for energizing said operating element in accordance with the fundamental of said derived current, and means for energizing one of said restraining elements in accordance with said derived current and the other of the restraining elements in accordance with an odd harmonic of said derived current.

11. In a protective arrangement for an electric system having a part into and out of which alternating currents flow, current transforming means for deriving a current dependent on the incoming and outgoing currents of said circuits, a device to be operated and means for controlling said device in accordance with a comparison of two effects one dependent on the fundamental of said derived current and the other dependent on a rectified current derived from at least one of the harmonics of said derived current and substantially independent of the fundamental thereof.

12. In a protective arrangement for an electric system having a part into and out of which alternating currents flow, current transforming means for deriving an alternating current dependent on the currents flowing into and out of said part and means energized by said derived current for effecting the isolation of said part from the rest of the system on the occurrence of a fault in the part including a relay device having operating and restraining elements, means for energizing said operating element in accordance with the fundamental of said derived current, means for energizing said restraining element in accordance with a harmonic of said derived current, and means for reducing the transient response of said operating element to a suddenly applied steep wave front current to a value less than the transient response of the restraining element.

13. In a protective arrangement for an electric system having a part into and out of which alternating currents flow, current transforming means for deriving an alternating current dependent on the currents flowing into and out of said part, a device to be operated, and means for controlling said device in accordance with a comparison of two effects one dependent on the fundamental of said derived current and substantially independent of any direct current component appearing in said derived current and the other dependent on at least one of the harmonics of said derived current and substantially independent of the fundamental thereof.

14. In a protective arrangement for an electric system having a part into and out of which alternating currents flow, current transforming means for deriving an alternating current dependent on the currents flowing into and out of said part, a device to be operated, and means for controlling said device in accordance with a comparison of two effects one dependent on the fundamental of said derived current and substantially independent of any direct current component appearing in said derived current and the other dependent on at least one of the harmonics of said derived current and substantially independent of the fundamental thereof, and means for preventing said one effect from transiently exceeding said other effect on the occurrence of a suddenly applied steep wave front current to said current transforming means.

15. In a protective arrangement for an electric system having a part into and out of which alternating currents flow, current transforming means for deriving an alternating current dependent on the currents flowing into and out of said part and means energized by said derived current for effecting the isolation of said part from the rest of the system on the occurrence of a fault in the part including a relay device having operating and restraining elements, means for energizing said operating element in accordance with the fundamental of said derived current, and means for energizing said restraining element by a direct current dependent on the harmonics of said derived current.

16. In a protective arrangement for an electric system comprising a part into and out of which alternating currents flow current transforming means for deriving a current dependent on said inflowing and outflowing currents, control means energized by said derived current for effecting the isolation of said part from the rest of the system on the occurrence of a fault in the part, and means selectively responsive to the predominant harmonics of said derived current due to magnetic phenomena of the current transforming means on fault currents for preventing erroneous operation of said control means.

17. In a protective arrangement for an electric system comprising a part into and out of which alternating currents flow, current transforming means for deriving a current dependent on said inflowing and outflowing currents, control means energized by said derived current for effecting the isolation of said part from the rest of the system on the occurrence of a fault in the part, and means selectively responsive to the harmonics of said derived current for preventing erroneous operation of said control means.

18. In a protective arrangement for an electric system comprising a part into and out of which alternating currents flow, current transforming means for deriving a current dependent on said inflowing and outflowing currents, control means energized by said derived current for effecting the isolation of said part from the rest of the system on the occurrence of a fault in the part, and means dependent upon the difference in wave form between said derived current caused by an internal fault and the derived current due to saturation of said current transforming means on faults outside said system part for preventing erroneous operation of said control means due to saturation of said current transforming means.

19. In a protective arrangement for an electric system comprising a part into and out of which alternating currents flow, current transforming means for deriving a current dependent on said inflowing and outflowing currents, control means energized by said derived current for effecting the isolation of said part from the rest of the system on the occurrence of a fault in the part, and means dependent upon the difference in wave form between said derived current caused by an internal fault and the derived current resulting from magnetizing inrush current and saturation of said current transforming means for preventing erroneous operation of said control means on the occurrence of external faults.

20. In a protective arrangement for an electric system comprising a part into and out of which alternating currents flow, current transforming means for deriving a current dependent on said inflowing and outflowing currents, control means energized by said derived current for effecting the isolation of said part from the rest of the system on the occurrence of a fault in the part, means dependent upon the difference in wave form between said derived current caused by an internal fault and the derived current resulting from magnetizing inrush currents of said system and said current transforming means for preventing erroneous operation of said control means in response to said magnetizing inrush current, and means for reducing the transient response of said control means to the steep wave front of said magnetizing inrush current.

21. In a protective arrangement for an alternating current system comprising system circuit interrupting means, means for selectively controlling said circuit interrupting means to effect an interrupting operation under predetermined abnormal system conditions and to prevent an interrupting operation under other system conditions including means for deriving from said system an alternating current dependent on the system current, two circuits connected to be energized by said derived current the electrical constants of one of said circuits being proportioned to pass substantially only the fundamental of said derived current and the electrical constants of the other of said circuits being proportioned to pass the harmonics of said derived current, and an electroresponsive device comprising means connected to be energized in accordance with the current in one of said circuits.

22. In a protective arrangement for an alternating current system, means for deriving from said system an alternating current dependent on the system current, two circuits connected to be energized by said derived current the electrical constants of one of said circuits being proportioned to pass substantially only the fundamental of said derived current and the electrical constants of the other of said circuits being proportioned to pass a direct current component and the harmonics of said derived current, and an electroresponsive device comprising a plurality of means respectively connected to be energized in accordance with the currents in said circuits.

23. In a protective arrangement for an alternating current system, means for deriving from said system an alternating current dependent on the system current, two circuits connected to be energized by said derived current the electrical constants of one of said circuits being proportioned to pass substantially only the fundamental of said derived current and the electrical constants of the other of said circuits being proportioned to pass the harmonics of said derived current, and an electroresponsive device comprising a plurality of cooperating means respectively connected to be energized in accordance with the currents in said circuits.

24. In a protective arrangement for an alternating current system, means for deriving from said system an alternating current dependent on the currents flowing into and out of a part of the system, an electroresponsive device comprising only two windings, means for effecting the energization of one of said windings by said derived current minus one of the harmonics thereof, and means for energizing the other of said windings by at least the said harmonic of said derived current.

25. In a protective arrangement for an alternating current electric system, means for deriving an alternating current dependent on the system current, a device to be operated, and means for controlling said device in accordance with a comparison of two effects one dependent on the fundamental of said derived current and substantially independent of any direct current component appearing in said derived current and the other dependent on at least one of the harmonics of said derived current and substantially independent of the fundamental and direct current component thereof.

26. In a protective arrangement for an electric system having a part into and out of which alternating currents flow, current transforming means for deriving alternating currents respectively dependent on each of the currents flowing into and out of said part, means for obtaining a resultant current dependent on the instantaneous sum of said derived currents, a device to be operated, and means for controlling said device in accordance with a comparison of two effects one dependent on the fundamental of said resultant current and substantially independent of any direct current component appearing in said resultant current and the other dependent on at least one of the harmonics and the direct current component of said resultant current and substantially independent of the fundamental thereof.

27. In a protective arrangement for an electric system having a part into and out of which alternating currents flow, means for effecting the isolation of said part from the rest of the system on the occurrence of a fault in said part including saturable current transformers respectively connected to be energized by said alternating currents, differential means for deriving from said current transformers a current dependent on the currents flowing into and out of said part, non-saturating transformer means for obtaining from said derived current substantially only the alternating current components thereof in a proportion substantially independent of the direct current component of the derived current, and relay means having a winding connected to be energized by said alternating current components.

28. In a protective arrangement for an electric system having a part into and out of which a plurality of alternating currents flow, differential means for effecting the isolation of said part from the rest of the system on the occurrence of a fault in said part including current transformers respectively connected to be energized by said alternating currents, relay means having a plurality of cooperating elements, means for energizing one of said elements from said current transformers in accordance with the fundamental of the instantaneous sum of the secondary currents of said current transformers and substantially independent of any direct current component of said sum current, and means for energizing another of said elements from said current transformers in accordance with the harmonics and the direct current component of said sum current and substantially only the alternating current components of the secondary currents of said current transformers dependent on the through current of said system part.

29. In a protective arrangement for an electric system having a part into and out of which alternating currents flow, current transforming means for deriving alternating currents respectively dependent on each of the currents flowing into and out of said part, means for obtaining a resultant current dependent on the instantaneous sum of said derived currents and a current dependent on the through current of said system part, a device to be operated, and means for controlling said device in accordance with a comparison of two effects one dependent on the fundamental of said sum current and the other dependent on at least one of the harmonics of the sum current and substantially only the alternating current components of said dependent through current.

30. In a protective arrangement for an electric system having a part into and out of which a plurality of alternating currents flow, current transforming means for deriving alternating currents respectively dependent on each of the currents flowing into and out of said part, means for obtaining from said derived currents a resultant current dependent on the instantaneous sum of said derived currents and a current dependent on the through current of said system part, a device to be operated, and means for controlling said device in accordance with the comparison of two effects one dependent on substantially only the fundamental of said sum current and another dependent on all of the alternating current components of said dependent through current.

31. In a protective arrangement for an electric system having a part into and out of which alternating currents flow, current transforming means for deriving alternating currents respectively dependent on each of the currents flowing into and out of said part, means for obtaining from said derived currents a resultant current dependent on the instantaneous sum of said derived currents and a current dependent on the through current of said system part, a device to be operated, means for controlling said device in accordance with a comparison of two effects one dependent on the fundamental of said sum current and the other dependent on at least one of the harmonics of the sum current and substantially only the alternating current components of the dependent through current, and means for independently controlling the extent of each of said one of the harmonics of the sum current and the alternating current components of the dependent through current on said other effect.

32. In a protective arrangement for an electric system having a part into and out of which alternating currents flow, means for effecting the isolation of said part from the rest of the system on the occurrence of a fault in said part including saturable current transformers respectively connected to be energized by said alternating currents, means for deriving from said current transformers a current dependent on the through current of said system part, non-saturating transformer means for obtaining from said derived current substantially only the alternating current components thereof in a proportion substantially independent of the direct current component of the derived current, and relay means having a winding connected to be energized by said alternating current components.

33. Relaying equipment for an alternating-current electrical device having a plurality of terminals, said relaying equipment comprising a current-responsive coupling device associated with each of the plurality of terminals, each coupling device deriving an alternating electrical quantity responsive, in a predetermined manner, to a current-condition in its associated terminal, electric-circuit means for vectorially combining all of the alternating electrical quantities to obtain a first resultant electrical relaying quantity, current-responsive-coupling, current-modifying, and summation means, associated with all of the several terminals, for deriving a second resultant electrical relaying quantity responsive, in a predetermined manner, to the arithmetical sum of the magnitudes of all of the terminal-currents regardless of their directions, differential-relay means having a relay-operating circuit and a relay-restraining circuit, and means for energizing said relay-operating circuit so as to be predeterminedly responsive, in some measure, to said first resultant relaying quantity, and means for energizing said relay-restraining circuit so as to be predeterminedly responsive, in some measure, to said second resultant relaying quantity.

34. Relaying equipment for an alternating-current electrical device having a plurality of terminals, said relaying equipment comprising a current-responsive coupling device associated with each of the plurality of terminals, each coupling device deriving an alternating electrical quantity responsive, in a predetermined manner, to a current-condition in its associated terminal, electric-circuit means for vectorially combining all of the alternating electrical quantities to obtain a first resultant electrical relaying quantity, a current-responsive coupling means and a rectifying means associated with each of the plurality of terminals for deriving a unidirectional electrical quantity responsive, in a predetermined manner, to a current-condition in its associated terminal, electric-circuit means for arithmetically adding all of the unidirectional electrical quantities to obtain a second resultant electrical relaying quantity, differential-relay means having a relay-operating circuit and a relay-restraining circuit, means for energizing said relay-operating circuit so as to be predeterminedly responsive, in some measure, to said first resultant relaying quantity, and means for energizing said relay-restraining circuit so as to be predeterminedly responsive, in some measure, to said second resultant relaying quantity.

35. Differential protective apparatus for an alternating-current electrical device having a plurality of terminals, said apparatus comprising current-responsive means associated with each terminal of the protected electrical device, means for totalizing the current-responses of all of said current-responsive means, and fault-responsive means for utilizing said totalized responses in the detection of faulty conditions in the protected electrical device, said fault-detection means comprising a differential relay having an alternating-current operating coil and a unidirectional-current restraining coil, operating-coil energizing means including an alternating-current relaying source for causing said operating coil to be responsive, in some measure, to fault-currents flowing into the protected electrical device at all terminals thereof, and restraining-coil energizing means including an alternating-current relaying-source and a rectifying means for causing said restraining coil to be responsive, in some measure, to through-currents flowing into the protected electrical device.

36. Relaying equipment for an alternating-current electrical device having a plurality of terminals, said relaying equipment comprising a current-responsive coupling device associated with each of the plurality of terminals, each coupling device deriving an alternating electrical quantity responsive, in a predetermined manner, to a current-condition in its associated terminal, electric-circuit means for vectorially combining all of the alternating electrical quantities to obtain a resultant electrical relaying quantity, a current-responsive coupling means and a rectifying means associated with said alternating-current electrical device for deriving a unidirectional electrical quantity responsive, in a predetermined manner, to a current-condition in its associated terminal, differential-relay means having a relay-operating circuit and a relay-restraining circuit, means for energizing said relay-operating circuit so as to be predeterminedly responsive, in some measure, to said resultant relaying quantity, and means for energizing said relay-restraining circuit so as to be predeterminedly responsive, in some measure, to said unidirectional electrical quantity.

37. A commercially practicable differential-protection device for a multi-terminal alternating-current power-apparatus of a commercial power-line frequency comprising, in combination, differential-relay means having a relay-operating circuit and a relay-restraining circuit, a current-responsive coupling device associated with each of the plurality of terminals of the protected apparatus, summation means for deriving a measurable voltage which is responsive, in some measure, to the instantaneous sum of the several coupling-device responses, integrated over the operating time of the differential-relay means, means for causing the relay operating circuit to be so energized that it is predeterminedly responsive, in some measure, to said sum, and means for causing the relay-restraining circuit to be so energized that it is responsive, in some measure, to the arithmetical sum of the several coupling device responses.

38. A commercially practicable differential-protection device for a multi-terminal alternating-current power-apparatus of a commercial power-line frequency, comprising, in combination, differential-relay means having a relay-operating circuit and a relay-restraining circuit, a current-responsive coupling device associated with each of the plurality of terminals of the protected apparatus, summation means for deriving a measurable voltage which is responsive, in some measure, to the instantaneous sum of the several coupling-device responses, integrated over the operating time of the differential-relay means, means for causing the relay-operating circuit to be so energized that it is predeterminedly responsive, in some measure, to said sum, and associated current-responsive coupling means and rectifying means associated with the protected apparatus for causing the relay-restraining circuit to be predeterminedly responsive, in some measure, to the rectified-current output of said associated current-responsive coupling means and rectifying means.

39. A commercially practicable differential-protection device for a multi-terminal alternating-current power-apparatus of a commercial power-line frequency, comprising, in combination, differential-relay means having a relay-operating circuit and a relay-restraining circuit, a current-responsive mutual-inductance coupling device associated with each of the plurality of terminals of the protected apparatus, each coupling device producing a measurable internal-voltage response which is dependent on the rate of change of current flowing into or out of the protected apparatus at that terminal, summation means for deriving a measurable voltage which is responsive, in some measure, to the instantaneous sum of the several coupling-device responses, integrated over the operating time of the differential-relay means, means for causing the relay-operating circuit to be so energized that it is predeterminedly responsive, in some measure, to said sum, and associated current-responsive coupling means and rectifying means associated with the protected power apparatus causing the relay-restraining circuit to be predeterminedly responsive, in some measure, to the rectified-current output of said associated current-responsive coupling means and rectifying means.

40. Protective relaying equipment for a multi-terminal polyphase electrical device which is subject to ground faults as well as phase faults, said relaying equipment comprising, in combination, a separate relaying equipment for each phase comprising a current-responsive coupling device associated with the corresponding phase-conductor of each of the plurality of terminals, each coupling device deriving an alternating electrical quantity responsive, in a predetermined manner, to a current-condition in its associated phase-conductor, electric-circuit means for vectorially combining all of the alternating electrical quantities of said phase to obtain a first resultant electrical relaying quantity, current-responsive-coupling, current-modifying, and summation means, associated with the corresponding phase-conductors of all of the several terminals, for deriving a second resultant electrical relaying quantity responsive, in a predetermined manner, to the arithmetical sum of the magnitudes of all of the terminal-currents regardless of their directions, a combined phase-fault-responsive and ground-fault-responsive differential-relay means for said phase, said differential-relay means having a relay-operating circuit and a relay-restraining circuit, and means for energizing said relay-operating circuit so as to be predeterminedly responsive, in some measure, to said first resultant relaying quantity, and means for energizing said relay-restraining circuit so as to be predeterminedly responsive, in some measure, to said second resultant relaying quantity.

41. Protective relaying equipment for a multi-terminal polyphase electrical device which is subject to ground faults as well as phase faults, said relaying equipment comprising in combination, a separate relaying equipment for each phase comprising a current-responsive coupling device associated with the corresponding phase-conductor of each of the plurality of terminals, each coupling device deriving an alternating electrical quantity responsive, in a predetermined manner, to a current-condition in its associated phase-conductor, electric-circuit means for vectorially combining all of the alternating electrical quantities of said phase to obtain a first resultant electrical relaying quantity, a current-responsive coupling means and a rectifying means associated with said phase-conductor of each of the plurality of terminals, for deriving a unidirectional electrical quantity responsive, in a predetermined manner, to a current condition in its associated phase-conductor, electric-circuit means for arithemetically adding all of the unidirectional electrical quantities to obtain a second resultant electrical relaying quantity, a combined phase-fault-responsive and ground-fault-responsive differential-relay means for said phase, said differential-relay means having a relay-operating circuit and a relay-restraining circuit, means for energizing said relay-operating circuit so as to be predeterminedly responsive, in some measure, to said first resultant relaying quantity, and means for energizing said relay-restraining circuit so as to be predeterminedly responsive, in some measure, to said second resultant relaying quantity.

42. Protective relaying equipment for a multiterminal polyphase electrical device which is subject to ground faults as well as phase faults, said relaying equipment comprising, in combination, a separate relaying equipment for each phase comprising current-responsive means associated with said phase-conductor of each of the plurality of terminals, means for totalizing the current-responses of all of said current-responsive means for said phase, and fault-responsive means for utilizing said totalized responses in the detection of faulty conditions in the protected electrical device, said fault-detection means comprising a combined phase-fault-responsive and ground-fault-responsive differential relay for said phase, said differential relay having an alternating-current operating coil and a unidirectional-current restraining coil, operating-coil energizing means including an alternating-current relaying source for causing said operating coil to be responsive, in some measure, to fault-currents flowing into said phase of the protected electrical device at all terminals thereof, and restraining-coil energizing means including an alternating-current relaying-source and a rectifying means for causing said restraining coil to be responsive, in some measure, to through-currents flowing into said phase of the protected electrical device.

43. Protective relaying equipment for a multiterminal polyphase electrical device which is subject to ground faults as well as phase faults, said relaying equipment comprising, in combination, a separate relaying equipment for each phase comprising a current-responsive coupling device associated with the corresponding phase-conductor of each of the plurality of terminals, each coupling device deriving an alternating electrical quantity responsive, in a predetermined manner, to a current-condition in its associated phase-conductor, electric-circuit means for vectorially combining all of the alternating electrical quantities of said phase to obtain a resultant electrical relaying quantity, a current-responsive coupling means and a rectifying means associated with said phase-conductor of the protected electrical device, for deriving a unidirectional electrical quantity responsive, in a predetermined manner, to a current-condition in its associated phase-conductor, a combined phase-fault-responsive and ground-fault-responsive differential-relay means for said phase, said differential-relay means having a relay-operating circuit and a relay-restraining circuit, means for energizing said relay-operating circuit so as to be predeterminedly responsive, in some measure, to said resultant relaying quantity, and means for energizing said relay-restraining circuit so as to be predeterminedly responsive, in some measure, to said unidirectional electrical quantity.

44. Protective relaying equipment for a multiterminal polyphase power-apparatus of a commercial power-line frequency, said protected apparatus being subject to ground faults as well as phase faults, said relaying equipment comprising, in combination, a separate relaying equipment for each phase comprising a combined phase-fault-responsive and ground-fault-responsive differential-relay means for said phase, said differential-relay means having a relay-operating circuit and a relay-restraining circuit, a current-responsive coupling device associated with said phase of each of the plurality of terminals of the protected apparatus, summation means for deriving a measurable voltage which is responsive, in some measure, to the instantaneous sum of the several coupling-device responses for said phase integrated over the operating time of the differential-relay means, means for causing the relay-operating circuit to be so energized that it is predeterminedly responsive, in some measure, to said sum, and associated current-responsive coupling means and rectifying means associated with said phase of the protected apparatus for causing the relay-restraining circuit to be predeterminedly responsive, in some measure, to the rectified-current output of said associated current-responsive coupling means and rectifying means.

CLAUDE D. HAYWARD.